United States Patent [19]

Martinuzzo

[11] Patent Number: 5,073,431
[45] Date of Patent: Dec. 17, 1991

[54] METHOD OF EMBODYING MULTI-PLY LAMINATES WITH AN EXTERNAL PLY IN QUALITY WOOD OR VEGETABLE TISSUE, FOR VENEERING AND FOR USE IN MANUFACTURING STITCHED GOODS, AND THE PRODUCT OBTAINED WITH SUCH A METHOD

[75] Inventor: Alberto Martinuzzo, Gorgo al Monticano, Italy

[73] Assignee: Flexible S.r.l., Bologna, Italy

[21] Appl. No.: 455,374

[22] PCT Filed: Mar. 31, 1989

[86] PCT No.: PCT/IT89/00022
§ 371 Date: Nov. 30, 1989
§ 102(e) Date: Nov. 30, 1989

[87] PCT Pub. No.: WO89/09130
PCT Pub. Date: Oct. 5, 1989

[30] Foreign Application Priority Data

Apr. 1, 1988 [IT] Italy .................. 40052 A/88

[51] Int. Cl.⁵ .................. B32B 3/06; B32B 7/08
[52] U.S. Cl. .................. 428/102; 144/346; 144/348; 144/352; 144/381; 156/93; 156/148; 156/222; 428/246
[58] Field of Search ........... 156/221, 222, 148, 93; 428/247, 102, 246; 144/381, 346, 348, 352

[56] References Cited

U.S. PATENT DOCUMENTS

| 211,130 | 1/1879 | Bradley | 144/381 |
| 2,070,527 | 2/1937 | Elmendorf | 428/247 |
| 4,205,107 | 5/1980 | Jaschke et al. | 156/266 X |
| 4,430,371 | 2/1984 | Boyes | 428/286 X |
| 4,731,140 | 3/1988 | Yontrarak | 428/247 X |

FOREIGN PATENT DOCUMENTS

| 512900 | 11/1980 | Australia . |
| 2062784 | 6/1972 | Fed. Rep. of Germany . |
| 60-46003 | 10/1985 | Japan ................. 144/381 |
| 8500318 | 1/1985 | PCT Int'l Appl. . |

Primary Examiner—Michael W. Ball
Assistant Examiner—Jeff H. Aftergut
Attorney, Agent, or Firm—Hoffman & Baron

[57] ABSTRACT

The method is one of producing multi-ply laminates incorporating an exposed veneer in quality wood or cork, and involved bonding the veneer (1) to a thin flexible thermoplastic film (2) by way of a layer of hot melt adhesive (3). The same laminate can be reinforced to enable its use in manufacturing sewn goods, such as bags and acessories, by ading a tough, close-woven backing fabric (20), bonded to the back of the film (2) in similar fashion via a further layer of adhesive (3), which provides the strength necessary to take a heavy stitch when sheets are sewn together.

7 Claims, 3 Drawing Sheets

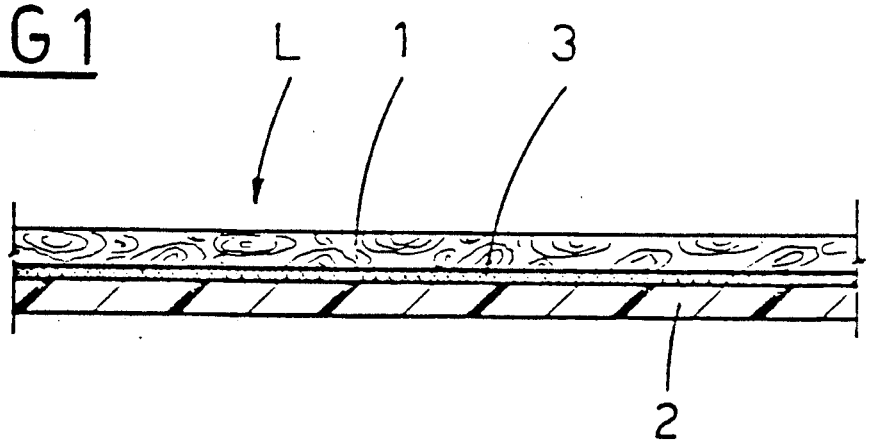
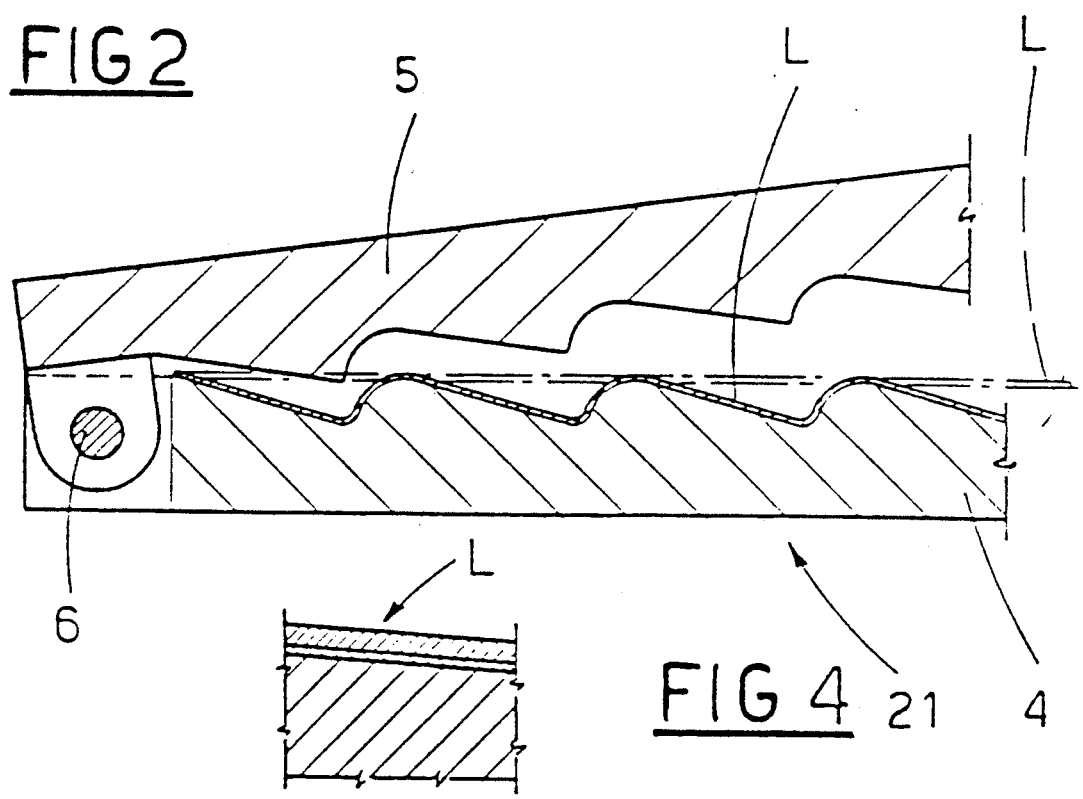
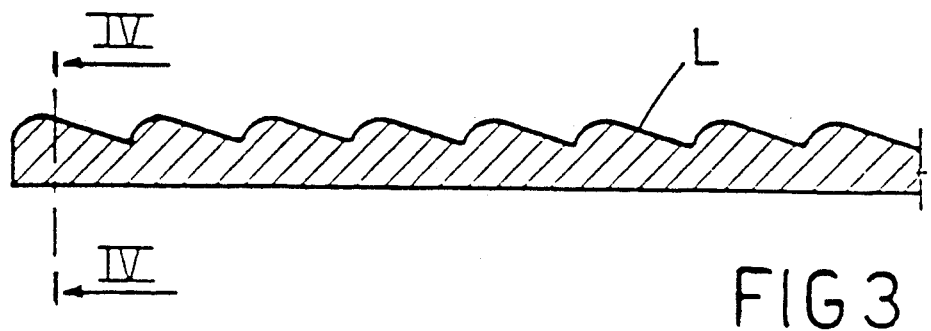

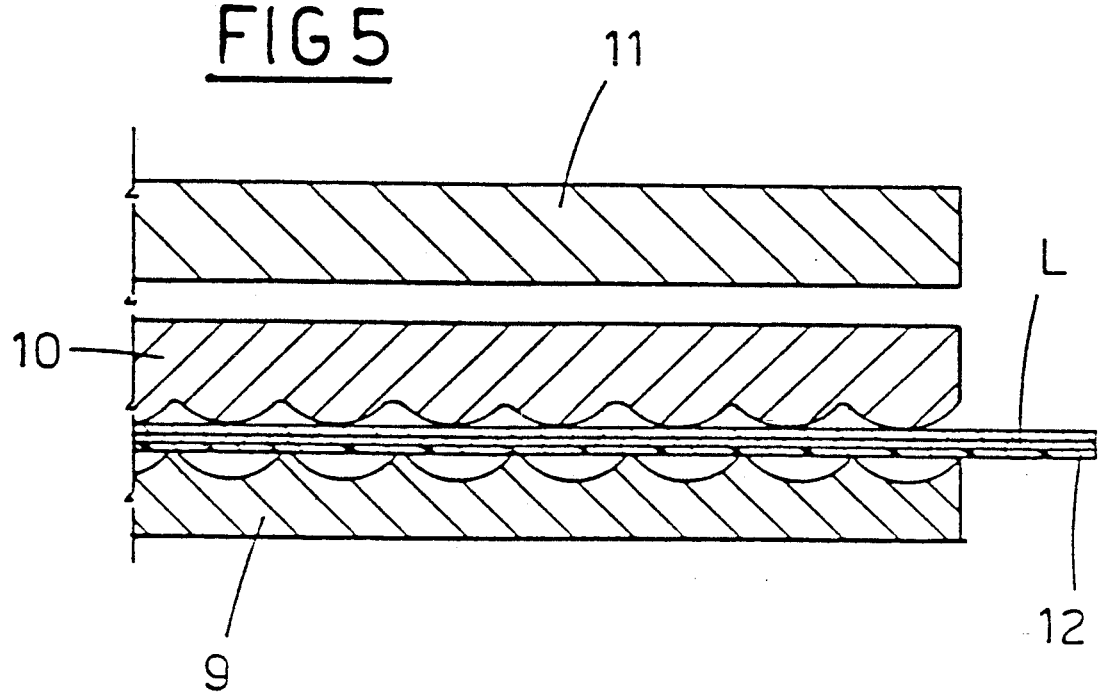
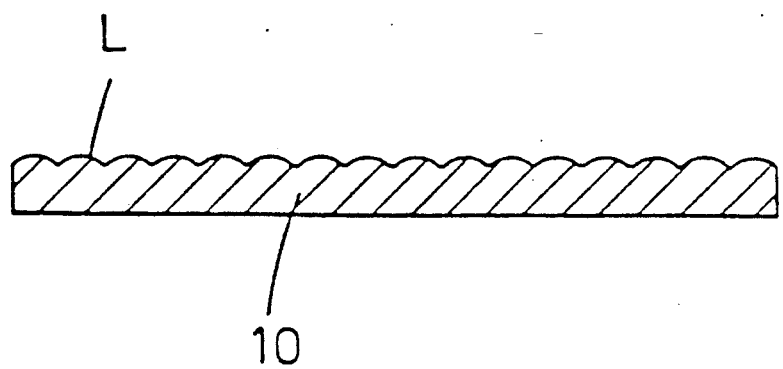

METHOD OF EMBODYING MULTI-PLY LAMINATES WITH AN EXTERNAL PLY IN QUALITY WOOD OR VEGETABLE TISSUE, FOR VENEERING AND FOR USE IN MANUFACTURING STITCHED GOODS, AND THE PRODUCT OBTAINED WITH SUCH A METHOD

The invention relates to a method of embodying multi-ply sheets of material with an external ply in quality wood or vegetable tissue, for use in veneering items such as pieces of furniture and in the manufacture of stitched goods, and to a product obtainable by implementation of such a method. The prior art in woodworking embraces the expedient of covering a surface, or an item fabricated from inferior wood or wood-composition board, with a veneer, i.e. a thin dressing of quality wood, to the end of producing a more desirable appearance at reasonable cost.

The materials utilized for veneering consist in thin sheets of wood obtained by sawing, rotary slicing or punching from suitably tough, flexible timbers such as birch or walnut, which are widely selected for the purpose by virtue of their ability to adapt to surfaces often less than totally flat. Before being used, that is, before being applied, veneers are glued to a paper backing and sanded down to a uniform thickness, and given a smooth finish.

Because of the need for toughness and flexibility in veneers, it is practically impossible to make use of certain quality woods (especially burr and figured cuts), and vegetable tissue such as cork; these materials are especially fragile, and often exhibit undulations that cannot be straightened without the veneer breaking up.

Moreover, in the case of manufactured items that require stitching, in particular, personal effects such as bags, wallets and similar accessories in the higher price ranges (i.e. leaving aside the wider area of cheap products fashioned in synthetic materials and aimed at mass consumption), use is made currently of high quality leathers or fabrics. In addition to their flexibility and toughness, the leathers and fabrics used for goods of this type possess other important natural properties, namely mechanical strength, for example along and around stitches, and general durability.

By contrast, quality materials such as burr woods and vegetable tissues (cork), cannot be utilized in this particular field precisely because they do not offer the flexibility, workability and durability of leathers and fabrics; the exact opposite is in fact the case: such materials are ultra-delicate, easily chipped, and at all events, difficult to work to a smooth surface. What is more, stitching will almost invariably tend to tear the material. Accordingly, the object of the present invention is one of embodying sheets of material having one side faced in wood or vegetable tissue, suitable for use in veneering furniture, or in general, for facing items that exhibit a mixed profile with numerous breaks in continuity, and which with additional reinforcement can be exploited in the manufacture of stitched goods without the occurrence of the difficulties aforementioned.

The stated object is achieved by adoption of the method as characterized in the appended claims. Such a method permits of bonding multi-ply sheets of material with an external ply in quality wood or vegetable tissue, and provides for application of the exposed ply to a thin sheet of thermoforming plastic material by way of a layer of hot melt adhesive. In the event of it being wished to invest the laminate with properties such as will enable it to withstand piercing, thus permitting its use in the manufacture of stitched articles, for example personal effects such as bags, wallets and similar matching accessories, the method comprises further bonding of the two-ply sheet, likewise by way of a layer of hot melt adhesive, onto a tough backing fabric impermeable to the adhesive, in such a way as to obtain a strong and durable stitch when sheets are sewn together.

The invention will now be described in detail, by way of example, with the aid of the accompanying drawings, in which:

FIG. 1 is the section through a laminate obtainable by implementation of the method of embodying multi-ply sheets with an external ply in quality wood or vegetable tissue according to the invention;

FIG. 2 is the schematic illustration of a mould used to shape the laminate of FIG. 1;

FIG. 3 illustrates the section through a moulding veneered with a laminate previously shaped in the mould of FIG. 1;

FIG. 4 is the section through IV—IV in FIG. 3, viewed in enlarged scale;

FIGS. 5 and 6 show alternative embodiments of the mould and the laminate of FIGS. 2 and 3;

Figure 7:
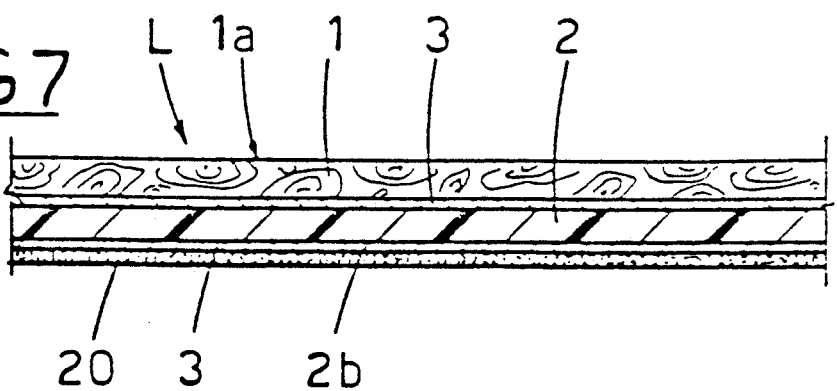
FIG. 7 is the section through a laminate obtainable by implementation of the method of embodying multi-ply sheets with an external ply in quality wood or vegetable tissue and suitable for the manufacture of sewn goods, according to the present invention.
Figure 8:
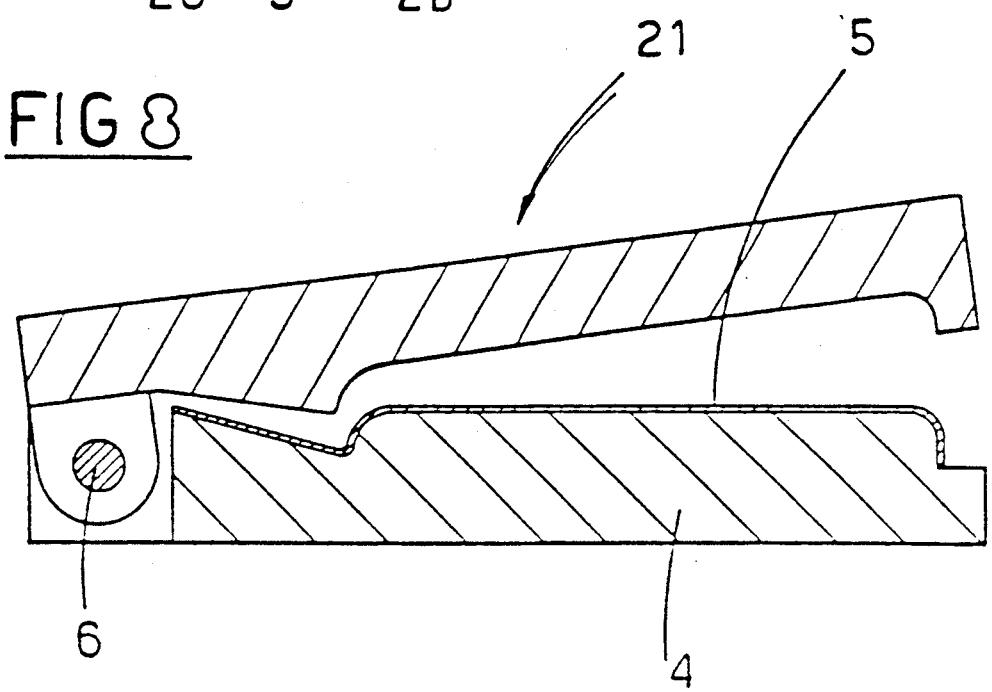
FIGS. 8 and 9 illustrate two different moulds used in shaping the laminate of FIG. 7.
Figure 9:
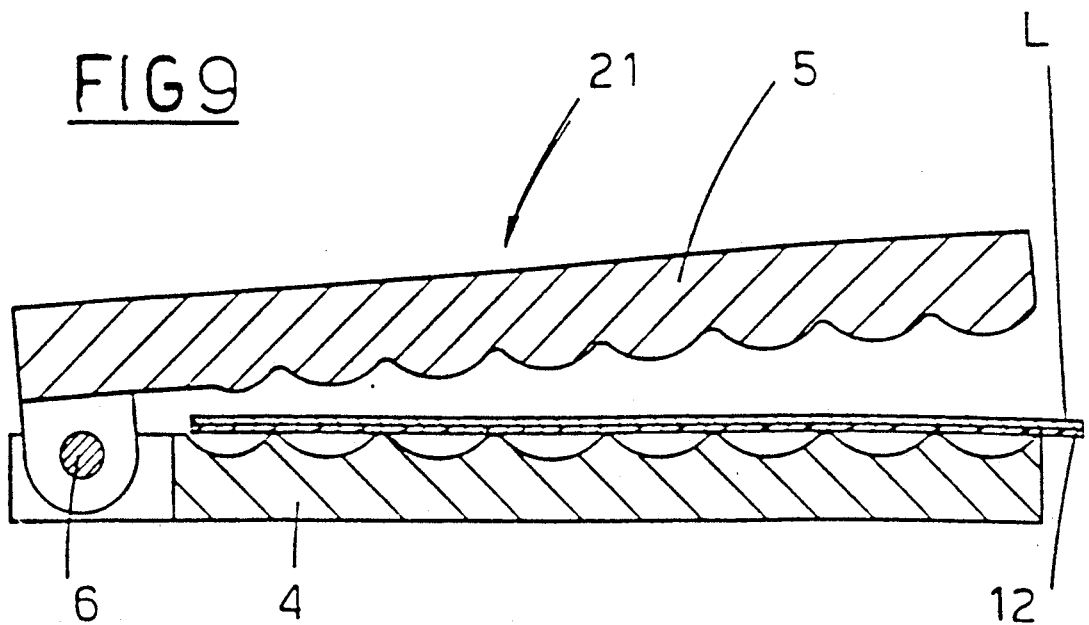

With reference to the above drawings, the method of embodying multi-ply sheets with an external ply in quality wood or vegetable tissue according to the invention consists substantially in applying the external ply, or veneer 1, to a thin flat film 2 of flexible thermoforming plastic material by way of a layer 3 of hot melt adhesive, in such a way as to produce a flat laminate L the surfaces 1a and 2a of which are devoid of irregularities or projections. In the event that the multi-ply sheet must possess strength sufficient to withstand the stress imposed by piercing, in order to enable its use in facing sewn goods generally, and in particular quality personal effects such as bags, wallets and similar matching accessories, the method further provides for addition of a suitable backing fabric 20 to the laminate L, applied to the entire underside 2b of the plastic film 2 (the side opposite from the veneer 1) by way of a further layer 3 of hot melt adhesive.

The fabric 20 utilized will exhibit a particularly close weave, i.e. with a high number of threads in both weft and warp, in order to ensure permanent impermeability to the adhesive 3 sandwiched between it and the plastic film 2. Such impermeability is important both when bonding the laminate and during subsequent manufacturing operations, as will become clear in due course. An aspect also of fundamental importance, likewise stemming from the close weave, is that the backing fabric 20 adds a further ply to the laminated structure, giving a tough base that will withstand stitching; thus, it becomes possible to eliminate the inevitable tearing and splitting that would otherwise occur at the points where the laminate is pierced by the needle.

In the event of a requirement for three-dimensional laminates, e.g. for picture frame mouldings, or for the side walls of bags etc., the method includes the step of placing the bonded laminate L between the bottom die 4 and the forcing die 5 of a mould 21, and heating the bottom die 4 to a temperature just sufficient to soften the adhesive 3 and the plastic film 2, say between 40° and 85° C.

Since the close weave of the backing fabric 20 disallows penetration of the adhesive 3 both during initial bonding and during subsequent shaping of the laminate, the moulded end-product will present a perfectly smooth back surface that is free from any traces of the bonding adhesive 3.

The forcing die 5 of the mould 21 is hinged to the bottom die 4 by way of a pivot 6 located at one end or along one side, thereby enabling pressure to be exerted on a laminate L positioned on the bottom die 4.

The laminate L is arranged on the bottom die 4 with the grain of the veneer 1 running at right angles to the pivot 6, such that when pressure is applied, the stretching action produced on the laminate L as a whole is exerted in one direction, i.e. 'with' the grain. More precisely, the combined action of the heat generated through the bottom die 4 and the moisture contained in the bonding adhesive 3, which evaporates into the veneer when reheated, produces a synergic effect that permits of deforming the wood or cork 1 without causing it to chip or flake.

In a preferred embodiment of the laminate, the exposed ply 1 will be of thickness between 0.5 and 1.2 mm, whereas the plastic film 2 will be between 0.05 and 0.3 mm thick.

In the event of it being necessary to position the laminate L in the mould with the veneer 1 face-down on the bottom die 4, the precaution is taken of locating a thin film of plastic material 12 under the laminate prior to lowering the forcing die 5, so as to prevent the veneer 1 from splitting or chipping; accordingly, the material 12 in question will be one having a low coefficient of friction in relation to the external surface of the veneer 1 and/or the bottom die 4.

FIG. 5 illustrates the operation of applying the laminate L to a board 10 using a mould with a flat forcing die 11 and a reeded bottom die 9, which includes the aforementioned step, implemented prior to lowering the forcing die 11, of locating a thin film of plastic material 12 with a low coefficient of friction under the laminate L so as to prevent the veneer 1 from splitting or chipping.

FIG. 6 illustrates the same board 10 in its finished state, that is, with the laminate L bonded to the reeded surface.

In a preferred version of the method according to the invention, the thin plastic film 2 will be a sheet of polyvinyl chloride (PVC), and the hot melt adhesive 3 will also be thermoplastic vinyl. The multi-ply product obtained by implementation of the method according to the invention consists in a quality wood or vegetable tissue veneer 1 bonded by way of a first layer of hot melt adhesive 3 to a thin film 2 of thermoforming plastic material, which, in the event of the finished laminate being destined for use in the manufacture of stitched goods such as personal effects (bags, wallets and matched accessories), is bonded in its turn to a backing fabric 20 by way of a further layer of hot melt adhesive 3.

Once offered to the plastic film 2 and bonded by way of the adhesive 3 through the application of a suitable degree of pressure, the exposed ply, or veneer 1, presents a smooth surface 1a entirely devoid of irregularities and/or projections. Thus, it will be clear enough that multi-ply sheet materials structured according to the invention afford notable practical and cost advantages; more exactly, it becomes possible to fashion laminates that are perfectly flat and flexible, becoming thermoplastic at relatively low temperatures, and which can be coiled in conventional manner. What is more, such a laminate offers increased mechanical strength, both in the face of the action of sanding machinery and in adapting to any irregularities in the surface of the board or fabricated item it is used to decorate. Additionally advantageous is the sharp reduction gained in pressing times required to obtain a firm, strong bond between the laminate and the support to which it is applied.

I claim:

1. A method of embodying multi-ply laminates with an external ply in quality wood or vegetable tissue for use in manufacturing of stitched goods, characterized in that it comprises the steps of:

bonding a veneer (1) under pressure to a thin flat film (2) of flexible and thermoplastic material by way of a layer (3) of thermoplastic adhesive, in such a way as to form a laminate (L) having exposed and reverse surfaces (1a, 2b) which are devoid of irregularities; and bonding the laminate (L) under pressure by way of a further layer (3) of thermoplastic adhesive onto a close-woven backing fabric (20), offered to an entire surface (2b) of the film of thermoplastic material (2) opposite that bonded to the veneer, which is impermeable to a further layer of adhesive (3) sandwiched between the fabric and the film.

2. A method as in claim 1 comprising additional steps of:

positioning the bonded laminate (L) between a bottom die (4) and a forcing die (5) of a mould (21) and heating the bottom die (4) to a temperature sufficient to soften the adhesive (3) and the plastic film (2);

drawing the dies (5, 4) together by rotation about a common axis disposed perpendicular to a grain of the veneer (1), in such a way that the laminate (L) is stretched in one direction only, coinciding with the grain of the veneer.

3. A method as in claim 1, wherein the veneer (1) is of a thickness between 0.5 and 1.2 mm and the plastic film (2) is of a thickness between 0.05 and 0.3 mm.

4. A method as in claim 2, wherein the bonded laminate (L) is positioned in the mould with the veneer (1) offered to the die (4), comprising an additional step, implemented prior to the step of drawing the dies (5, 4) together, of interposing a thin layer of plastic material (12) having a low coefficient of friction in relation to the veneer (1) or to the die (4) to prevent the veneer (1) from breaking or splitting.

5. A method as in claim 1, wherein the thermoplastic film (2) is polyvinyl chloride.

6. A method as in claim 1, wherein the thermoplastic adhesive (3) is a vinyl adhesive.

7. A product obtained by implementation of the method of claim 1, characterized in that it consisting in a veneer (1) of quality wood or vegetable tissue, a thin flexible film (2) of thermoforming plastic material, and a backing fabric (20) bonded one to the next over their entire surface areas by way of a first layer of thermoplastic adhesive (3) sandwiched between the veneer (1) and the film (2), and a second layer of thermoplastic adhesive (3) sandwiched between the film (2) and the fabric (20);

in that with its entire area bonded to the plastic film (2) by way of the adhesive (3), the veneer (1) exhibits an exposed surface (1a) that is devoid of irregularities; and in that the backing fabric (20) presents a close weave such as will ensure impermeability to the adhesive (3) sandwiched between its own surface and that of the plastic film (2), and affords a base of strength sufficient to receive a stitch.

* * * * *